US009210658B2

(12) United States Patent
Hokao

(10) Patent No.: US 9,210,658 B2
(45) Date of Patent: Dec. 8, 2015

(54) COMMUNICATION DEVICE, COMMUNICATION SYSTEM, COMMUNICATION METHOD, AND PROGRAM

(75) Inventor: Tomoaki Hokao, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 132 days.

(21) Appl. No.: 14/004,793

(22) PCT Filed: Jan. 5, 2012

(86) PCT No.: PCT/JP2012/000042
§ 371 (c)(1),
(2), (4) Date: Sep. 12, 2013

(87) PCT Pub. No.: WO2012/132165
PCT Pub. Date: Oct. 4, 2012

(65) Prior Publication Data
US 2014/0010134 A1    Jan. 9, 2014

(30) Foreign Application Priority Data
Mar. 29, 2011   (JP) .................................. 2011-072667

(51) Int. Cl.
G08C 17/00 (2006.01)
H04W 52/02 (2009.01)
H04W 76/04 (2009.01)

(52) U.S. Cl.
CPC ...... *H04W 52/0222* (2013.01); *H04W 52/0229* (2013.01); *H04W 76/046* (2013.01)

(58) Field of Classification Search
None
See application file for complete search history.

(56) References Cited

U.S. PATENT DOCUMENTS

| 8,638,711 B2* | 1/2014 | Patil et al. ...................... 370/318 |
| 2005/0232312 A1 | 10/2005 | Suzuki |
| 2010/0182970 A1 | 7/2010 | Cherian et al. |
| 2011/0038347 A1* | 2/2011 | Patil et al. ...................... 370/331 |
| 2012/0077495 A1* | 3/2012 | Kim et al. .................. 455/435.1 |
| 2012/0207035 A1* | 8/2012 | Simha et al. .................. 370/252 |
| 2012/0220299 A1* | 8/2012 | Sharma et al. ................ 455/436 |

FOREIGN PATENT DOCUMENTS

| JP | 2005-286767 | 10/2005 |
| JP | 2006-515491 | 5/2006 |
| WO | WO 2010/054391 | 5/2010 |
| WO | WO 2011/019832 | 2/2011 |

OTHER PUBLICATIONS

International Search Report, PCT/JP2012/000042, Feb. 7, 2012.
(Continued)

*Primary Examiner* — Michael J Moore, Jr.
(74) *Attorney, Agent, or Firm* — Young & Thompson

(57) ABSTRACT

An information processing device (100) stores information (hereinafter, referred to as communication network information) in advance, which information indicates whether or not a communication network (200) is compatible with a Fast Dormancy function. Then, the information processing device (100) reads the communication network information of the communication network (200) when a packet communication with an information server (220) is ended, and sets a free procedure of a communication channel based on the communication network information that is read. Then, information processing device (100) frees the communication channel according to the free procedure that is set.

14 Claims, 10 Drawing Sheets

(56) References Cited

OTHER PUBLICATIONS

Ericsson, ST-Ericsson, Clarifications on Fast Dormancy, R2-095713, 3GPP, Oct. 16, 2009, paragraph 2.3.
Supplementary European Search Report dated Sep. 15, 2015 in corresponding European Patent Application No. 12764698.

Qian Feng et al., "TOP: Tail Optimization Protocol For Cellular Radio Resource Allocation", Network Protocols (ICNP), 2010 18th IEEE International Conference, IEEE, Oct. 5, 2010, pp. 285-294, XP031864737.

* cited by examiner

FIG. 4                                                                   160

| COMMUNICATION NETWORK IDENTIFICATION INFORMATION | COMMUNICATION NETWORK INFORMATION | MEASUREMENT TIME |
|---|---|---|
| × × × | COMPATIBLE | HIGH BIT RATE: 5 SECONDS<br>MODERATE BIT RATE: 10 SECONDS<br>CHANNEL FREE: 20 SECONDS |
| × △ × | RESPONSE | HIGH BIT RATE: 3 SECONDS<br>MODERATE BIT RATE: 5 SECONDS<br>CHANNEL FREE: 20 SECONDS |
| × △ △ | INCOMPATIBLE (COUNT NUMBER OF NO RESPONSE : ○TIME) | HIGH BIT RATE: 5 SECONDS<br>MODERATE BIT RATE: 10 SECONDS<br>CHANNEL FREE: 20 SECONDS |
| ⋮ | ⋮ | ⋮ |

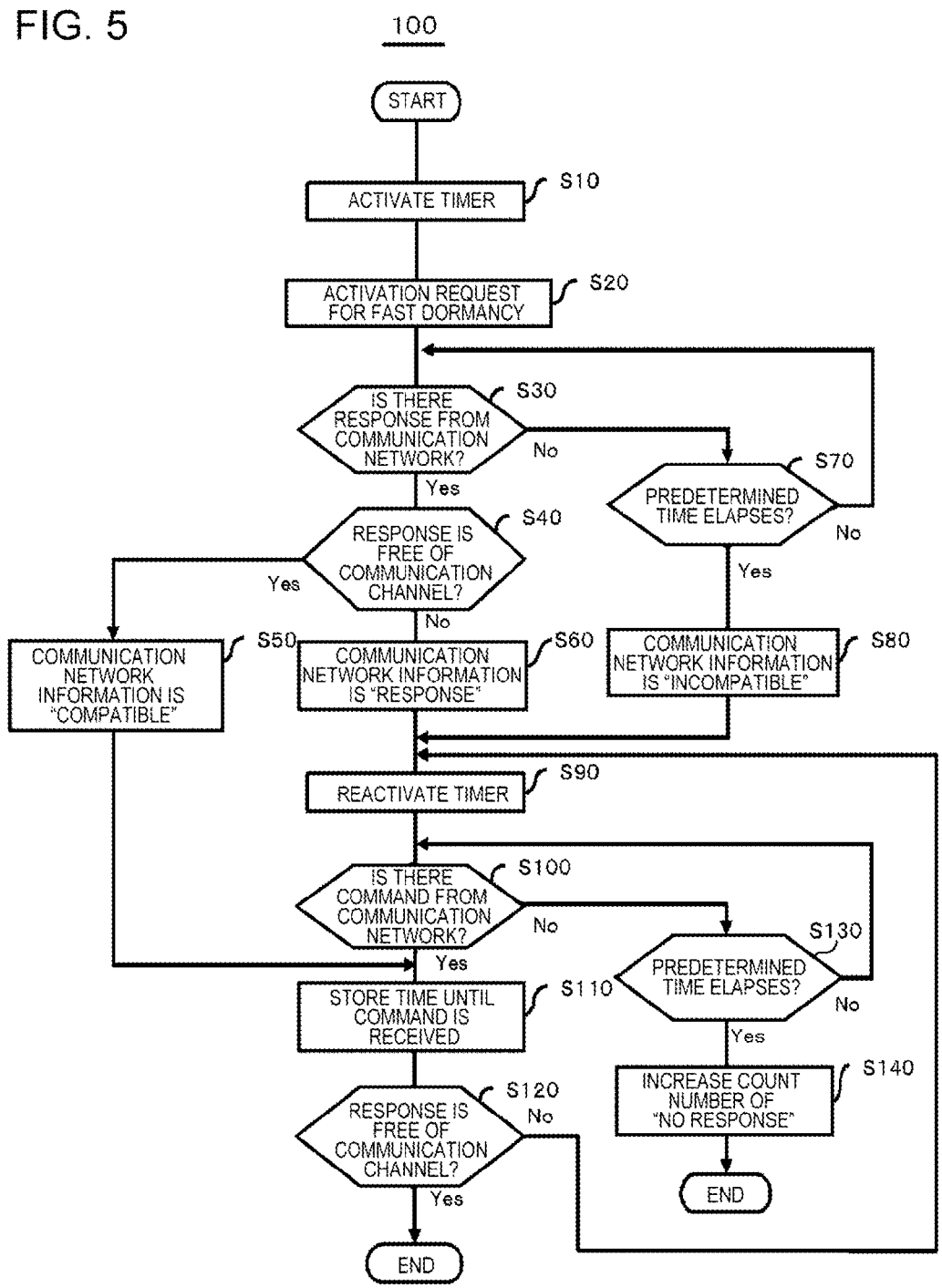

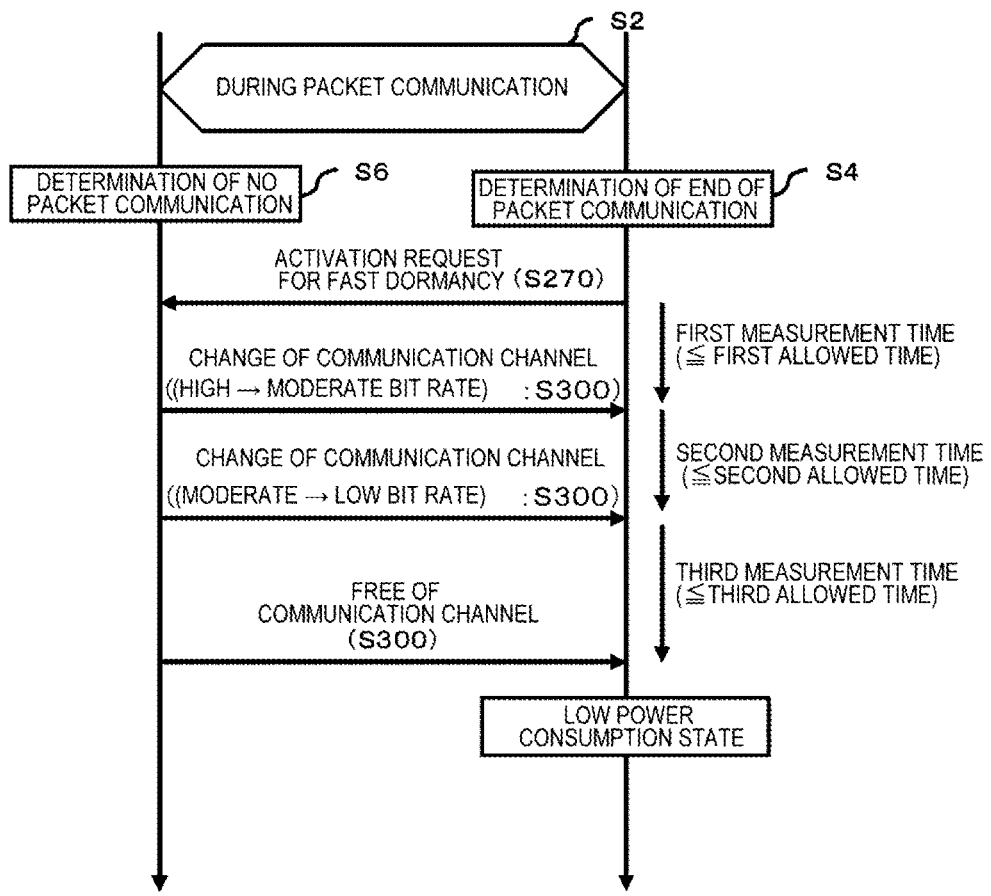

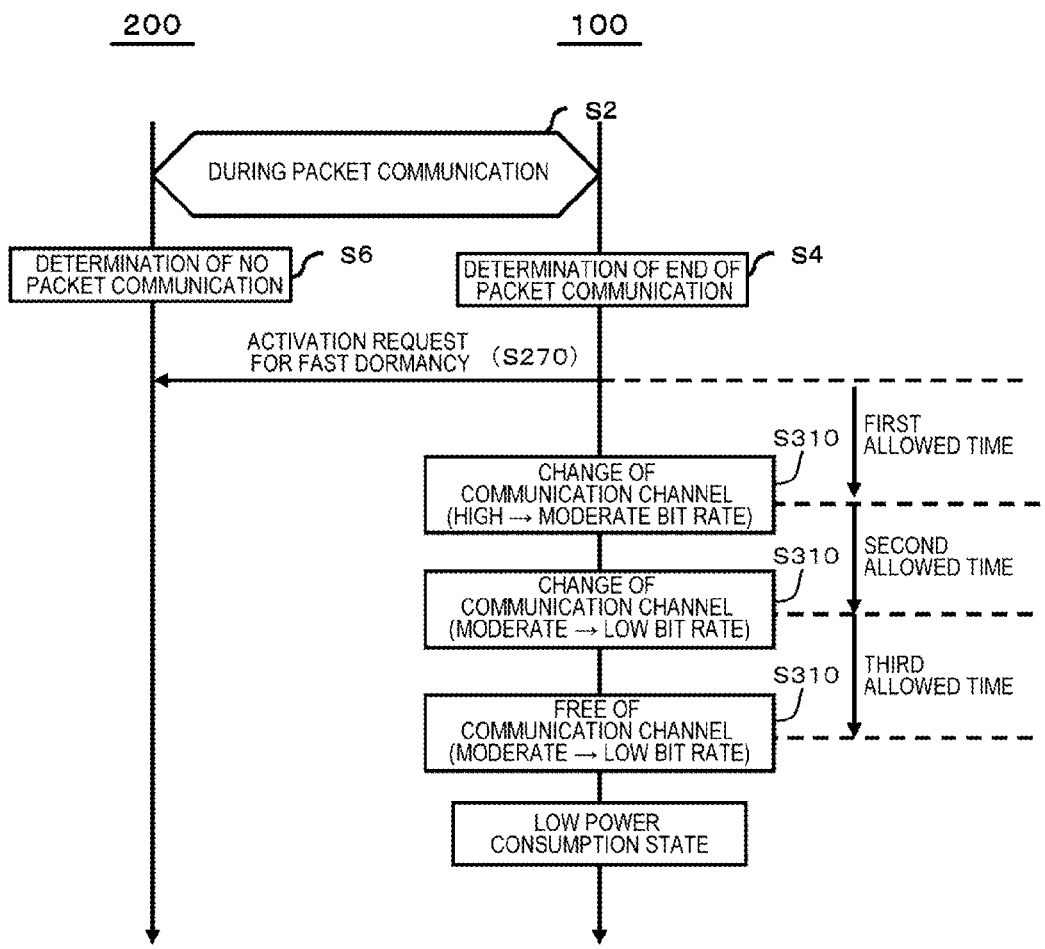

COMMUNICATION DEVICE, COMMUNICATION SYSTEM, COMMUNICATION METHOD, AND PROGRAM

TECHNICAL FIELD

The present invention relates to a communication device, a communication system, a communication method, and a program which is compatible with a Fast Dormancy function.

BACKGROUND ART

One of characteristics required for communication devices such as mobile communication terminals is low power consumption. In order to achieve the low power consumption, it is preferable to cause the communication device to be in a sleep mode. Patent Document 1 discloses that if a sleep request from a terminal to a base station is rejected, the sleep request is re-transmitted, and if the sleep request is rejected again, the sleep request is not transmitted until non-request response is received from the base station.

RELATED DOCUMENT

Patent Document

[Patent Document 1] PCT Japanese Translation Patent Publication No. 2006-515491

DISCLOSURE OF THE INVENTION

In recent years, there is a function called Fast Dormancy. If this function is used, it is possible to free a communication channel on the initiative of the terminal when a packet communication is ended, and thus it is possible to achieve the low power consumption.

However, as a result of a study by the inventor, it is turned out that when the communication network is not compatible with Fast Dormancy, even if the communication terminal performs an operation conforming to Fast Dormancy, the communication channel is not freed, and thus as a result, power may be wasted in the communication terminal.

An object of the present invention is to provide a communication device, a communication system, a communication method, and a program which can reduce power consumption even when a communication network is not compatible with Fast Dormancy.

According to the present invention, there is provided a communication device including a communication network information storage unit which stores communication network information indicating whether or not a communication network that performs a packet communication is compatible with a Fast Dormancy function;

a free procedure setting unit which reads the communication network information from the communication network information storage unit when the packet communication through the communication network is ended, and sets a free procedure of a communication channel based on the communication network information; and a control unit which frees the communication channel according to the procedure that the free procedure setting unit sets.

According to the present invention, there is provided a communication system including a communication network, and a communication device that performs a packet communication through the communication network, in which the communication device includes:

a communication network information storage unit which stores communication network information indicating whether or not the communication network is compatible with a Fast Dormancy function;

a free procedure setting unit which reads the communication network information from the communication network information storage unit when the packet communication through the communication network is ended, and sets a free procedure of a packet communication based on the communication network information; and a control unit which frees the communication channel according to the procedure that the free procedure setting unit sets.

According to the present invention, there is provided a communication method including causing a communication device to store communication network information indicating whether or not a communication network that performs a packet communication is compatible with a Fast Dormancy function; and causing the communication device to read the stored communication network information when the packet communication through the communication network is ended, to set a free procedure of a communication channel based on the communication network information, and to free the communication channel according to the free procedure.

According to the present invention, there is provided a program that causes a communication device to perform a packet communication through a communication network, the program causing the communication device to implement:

a function of storing communication network information indicating whether the communication network is compatible with a Fast Dormancy function;

a function of reading the stored communication network information when the packet communication through the communication network is ended, and setting a free procedure of a communication channel based on the communication network information; and a function of freeing the communication channel according to the free procedure that is set.

According to the present invention, it is possible to reduce power consumption of the communication device even when a communication network is not compatible with Fast Dormancy.

BRIEF DESCRIPTION OF THE DRAWINGS

These and other objects, features, and advantages of the invention will be apparent through reference to the description of preferred embodiments and accompanying drawings.

FIG. 4 is a diagram illustrating an example of data, in a table format, that a communication network information storage unit stores.

FIG. 5 is a flowchart illustrating a first operation of the information processing device.

FIG. 9 is a diagram describing an effect of an exemplary embodiment.

FIG. 10 is a diagram describing an effect of an exemplary embodiment.

DESCRIPTION OF EMBODIMENTS

Figure 1:
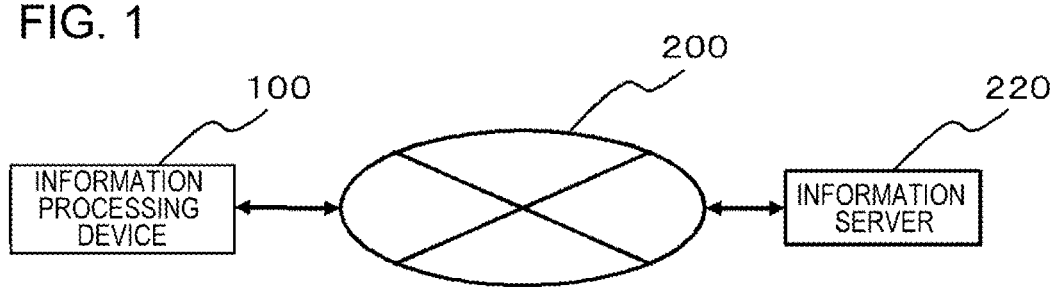
FIG. 1 is a diagram illustrating a functional configuration of a communication system of an exemplary embodiment.

Hereinafter, exemplary embodiments of the present invention will be described using the drawings. In the drawings, the same components are denoted by the same reference numerals, and thus an explanation thereof will not be repeated.

FIG. 1 is a diagram illustrating a functional configuration of a communication system of an exemplary embodiment. The communication system includes an information processing device 100 and a communication network 200. The information processing device 100 performs a packet communication with the communication network 200. The communication network 200 has, for example, an information server 220, and the information processing device 100 receives information from the information server 220. Note that, if the information server 220 is different, a path from the information server 220 to the information processing device 100 is different, so the communication network 200 in the present exemplary embodiment is different.

The information processing device 100 is, for example, a mobile communication terminal (including a mobile phone, a portable game device, and a tablet PC), but may be a personal computer such as a notebook computer. The information processing device 100 stores in advance information indicating whether the communication network 200 is compatible with the Fast Dormancy function (hereinafter, described as communication network information). The Fast Dormancy function is defined, for example, in 3GPP Release.8 (TS25.331.8.1.14). Then, the information processing device 100 reads the communication network information of the communication network 200 when the packet communication with the information servers 220 is ended, and sets a free procedure of the communication channel, based on the communication network information that it reads. Then, the information processing device 100 frees the communication channel according to the free procedure that it sets. Note that, a process described below is set in order not to violate T323 (3GPP Release.8).

Figure 2:
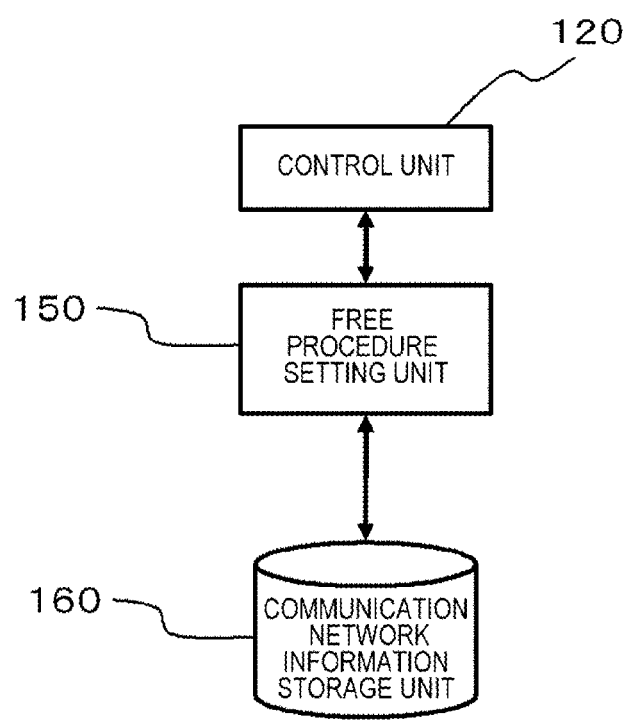
FIG. 2 is a block diagram illustrating the functional configuration of the information processing device.

FIG. 2 is a block diagram illustrating a functional configuration of an information processing device 100.

Figure 3:
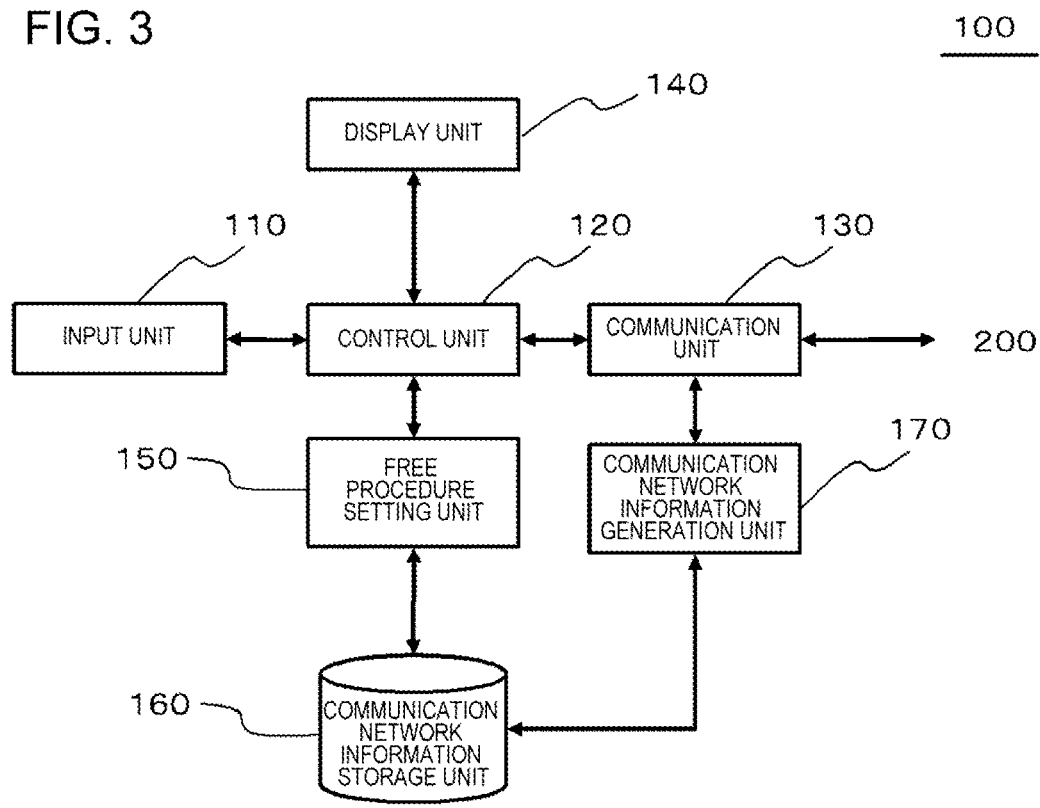
FIG. 3 is a block diagram illustrating the functional configuration of the information processing device in detail.

FIG. 3 is a block diagram illustrating the functional configuration of the information processing device 100 in detail. The information processing device 100 includes a communication network information storage unit 160, a free procedure setting unit 150, and a control unit 120. The communication network information storage unit 160 stores the above-mentioned communication network information. When the packet communication through the communication network 200 is ended, the free procedure setting unit 150 reads the communication network information from the communication network information storage unit 160 and sets a free procedure of the communication channel based on the communication network information. The control unit 120 frees the communication channel according to the procedure that the free procedure setting unit 150 sets. Accordingly, when the packet communication with the information server 220 is ended, the free procedure setting unit 150 reads the communication network information of the communication network 200 from the communication network information storage unit 160, thereby setting the free procedure of the communication channel, based on the communication network information that is read. Therefore, in both cases where the communication network is compatible with Fast Dormancy and is not, it is possible to free the communication channel according to the procedure corresponding to the respective cases.

FIG. 3 is a block diagram illustrating the functional configuration of the information processing device 100 in more detail. The information processing device 100 further includes an input unit 110, a communication unit 130, a display unit 140, and a communication network information generation unit 170. The input unit 110 acquires information that a user of the information processing device 100 inputs and outputs the information to the control unit 120. The input unit 110 may be implemented using an input button or a touch panel function. The communication unit 130 is an interface through which the information processing device 100 performs a communication with an outside. For example, when the information processing device 100 is a wireless communication terminal, the communication unit 130 includes an antenna, a reception processing unit, and a transmission processing unit. The display unit 140 displays information according to an instruction from the control unit 120. Further, the control unit 120 has a timer or a function of measuring time.

The communication network information generation unit 170 transmits an activation request for Fast Dormancy to the communication network 200, and generates communication network information corresponding to the communication network 200, based on a response with respect to the activation request from the communication network 200. The communication network information generation unit 170 also has the timer function and the time measurement function. The details of the function of the communication network information generation unit 170 will be described later using a flowchart.

Note that, each component of the information processing device 100 shown in FIG. 3 does not illustrate a configuration in the hardware unit, but illustrate a block in a functional unit. Each component of the information processing device 100 is implemented with any combination of software and hardware, that is, mainly a CPU of a computer, a memory, a program loaded on the memory for implementing the components in the figure, a memory unit such as a hard disk for storing the program, and an interface for communication network connection. Then, there are various modification examples in implementing methods and the devices.

FIG. 4 is a diagram illustrating an example of data that a communication network information storage unit 160 stores in a table format. The communication network information storage unit 160 associates communication network identification information, communication network information, and a measurement time with each other and stores the associated information.

The communication network identification information is information to identify the communication network 200 from each other, and has, for example, network operator codes and various kinds of information that is notified from the communication network 200 (including location area codes and cell IDs). This is because the operation of the communication network varies depending on not only the difference between network operators, but also the suppliers of network equipment (vendors), areas, and the like.

The communication network information indicates, as described above, whether the communication network 200 is compatible with the Fast Dormancy function. In the exemplary embodiment, the communication network information is classified into "compatible", "response", and "incompatible." "Compatible" indicates that the communication network 200 is compatible with the Fast Dormancy function, and "incompatible" indicates that the communication network 200 is not compatible with the Fast Dormancy function. Further, "response" indicates that the communication network 200 responds to the Fast Dormancy request, but does not transmit a command of freeing the communication channel. Further, in a case of storing "response" or "incompatible" as communication network information, the communication network 200 stores the count number of times (the count of no response) when there is no response with respect to the Fast Dormancy request. The details of this information will be described later using a flowchart.

The measurement time is the time from when an action occurs in the communication network 200 until when a command (message) from the communication network 200 is received. For example, the communication network 200 stores the time (actual measurement value) from when a packet communication is ended until when a communication channel is changed. In the present exemplary embodiment, the communication network information storage unit 160 stores respectively the time during which a communication channel having a high bit rate is maintained, the time from when the communication channel is changed from the high bit rate to a moderate bit rate until when the communication channel is changed to a low bit rate (that is, the time during which moderate bit rate is maintained), and the time from when the communication channel is changed to the low bit rate until when the communication channel is freed. Note that, in a case of receiving a plurality of commands until a free command of the communication channel is received, the communication network information storage unit 160 stores the plurality of commands in association with the measurement time in the order of receiving.

FIG. 5 is a flowchart illustrating a first operation of the information processing device 100. The flowchart illustrates a process when the communication network information generation unit 170 of the information processing device 100 generates the communication network information. This process is performed, for example, when the information processing device 100 performs an initial packet communication with the communication network 200.

First, the communication network information generation unit 170 activates the timer function (step S10). Then, the communication network information generation unit 170 transmits the activation request for Fast Dormancy to the communication network 200 through the communication unit 130 (step S20).

The communication network information generation unit 170 determines whether there is a response from the communication network 200 (step S30). When there was a response from the communication network 200 (step S30: Yes), the communication network information generation unit 170 determines whether the response is a free command of the communication channel (step S40). When the response was the free command (step S40: Yes), the communication network information generation unit 170 determines that the communication network 200 is compatible with the Fast Dormancy function, and stores the communication network identification information included in the response that is received in step S30 and "compatible" in the communication network information storage unit 160 (step S50).

When the response received in step S30 was not the free command of the communication channel (step S40: No), the communication network information generation unit 170 stores the communication network identification information included in the response that is received in step S30 and "response" in the communication network information storage unit 160 (step S60).

Further, when there is no response from the communication network 200, the communication network information generation unit 170 waits for a response from the communication network 200 until a predetermined time elapses (step S30: No and step S70: No). Then, when a predetermine time elapses without response from the communication network 200 (step S30: No and step S70: Yes), the communication network information generation unit 170 determines that the communication network 200 is not compatible with the Fast Dormancy function, and stores the communication network identification information included in the response that is received in step S30 and "incompatible" in the communication network information storage unit 160 (step S80).

Then, the communication network information generation unit 170 reactivates the timer function (step S90), and determines whether the command from the communication network 200 is received (step S100). This command is, for example, a command to change the communication channel to relatively lower bit rate or a command to free the communication channel. In a case of receiving a command from the communication network 200 (step S100: Yes), a measurement time from when the timer is re-activated until when the command is received is stored in the communication network information storage unit 160 with the content of the command (step S110). The communication network information generation unit 170 repeats the process from step S90 to step S110 until the free command of the communication channel is received (step S120: No). Then, in a case of receiving the free command of the communication channel from the communication network 200 (step S120: Yes), the communication network information generation unit 170 ends the process. Further, from when the timer is activated (step S90) until when the timer is timed out, the communication network information generation unit 170 waits for a command from the communication network 200 (step S100: No and step S130: No). Then, in a case of not receiving any commands from the communication network 200 (step S100: No and step S130: Yes), the communication network information generation unit 170 increases the count number of "no response" in the communication network information storage unit 160 by one (step S140), and ends the process.

Note that, the communication network information generation unit 170 repeatedly performs the process from step S10 to step S80 a plurality of times, and may store "incompatible" formally only when becoming "incompatible" in any cases. Accordingly, when the communication network 200 is compatible with Fast Dormancy but is not able to receive temporarily the free command of the communication channel due to the temporal deterioration in the communication environment, it is possible to suppress a case in which "incompatible" is erroneously stored.

Further, the communication network information generation unit 170 may perform a process of storing "incompatible" only when the received power level is a reference value or more.

In addition, it is preferable that the communication network information generation unit 170 periodically performs the process shown in FIG. 5 and updates the communication network information stored in the communication network information storage unit 160. This is because the function of the communication network 200 may be changed.

Figure 6:
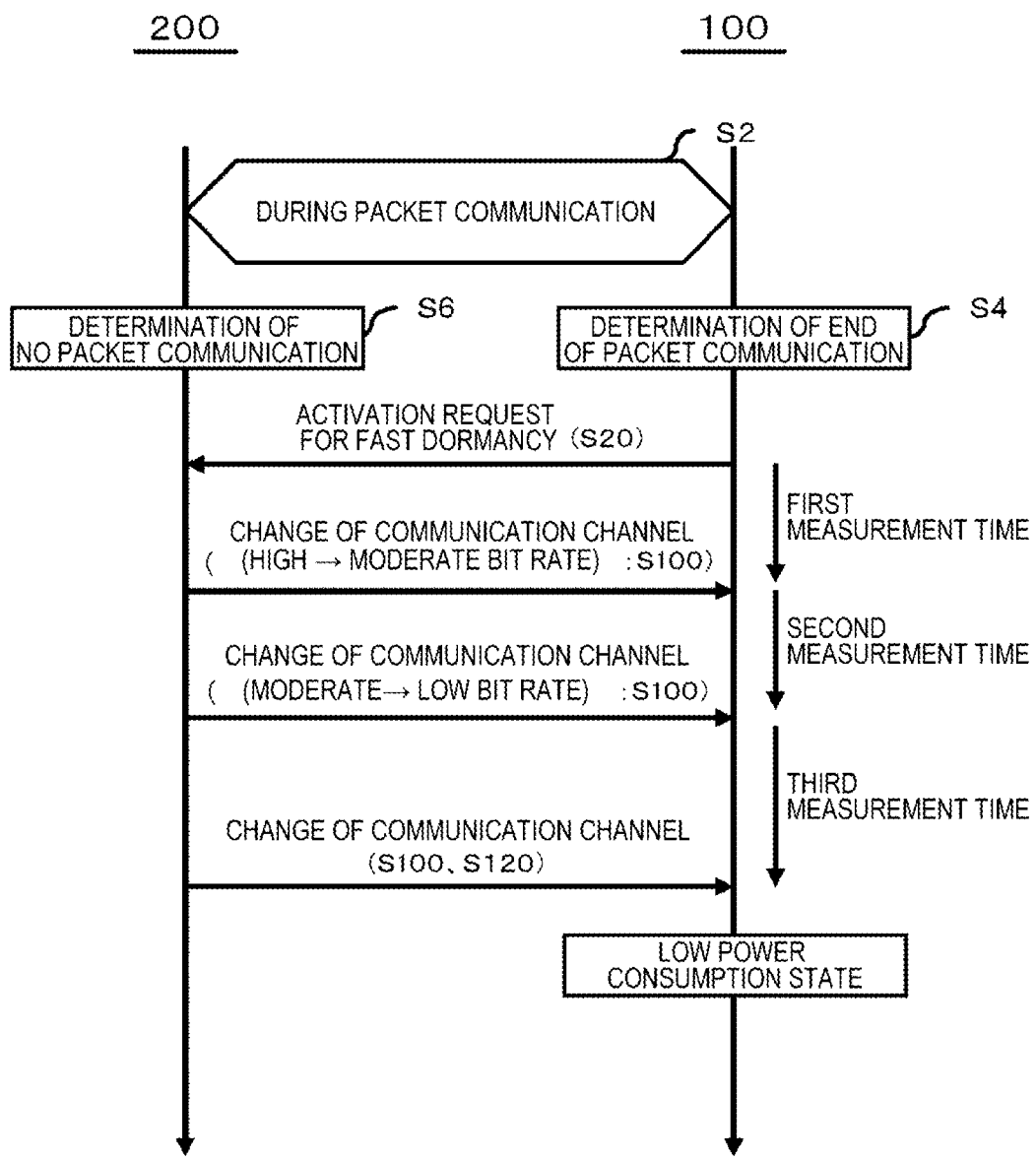
FIG. 6 is a diagram illustrating a case where a process shown in FIG. 5 is performed with respect to a communication network that is not compatible with the Fast Dormancy function.

FIG. 6 is a diagram illustrating a case where a process shown in FIG. 5 is performed with respect to a communication network 200 that is not compatible with the Fast Dormancy function. The packet communication is performed between the information processing device 100 and the communication network 200 (step S2), and when the packet communication is ended, a termination determination of packet communication is performed in the information processing device 100 (step S4), and a determination whether there is no packet being transmitted is performed in the communication network 200 (step S6).

If it is determined that the packet communication is ended, the communication network information generation unit 170 of the information processing device 100 transmits the activation request for Fast Dormancy to the communication network 200 (step S20). However, since the communication network 200 is not compatible with Fast Dormancy, the communication network 200 does not immediately transmit the free command of the communication channel to the information processing device 100. Eventually, the communication network 200 transmits the change command of the communication channel to the information processing device 100 (step S100). The change command is performed twice in the example shown in the diagram. Then, the time between each change process is measured and stored in the communication network information storage unit 160. Then, at last, the communication network 200 transmits the establishment command of the communication channel to the information processing device 100 (step S120). Thereafter, the information processing device 100 transits to a low power consumption state.

Figure 7:
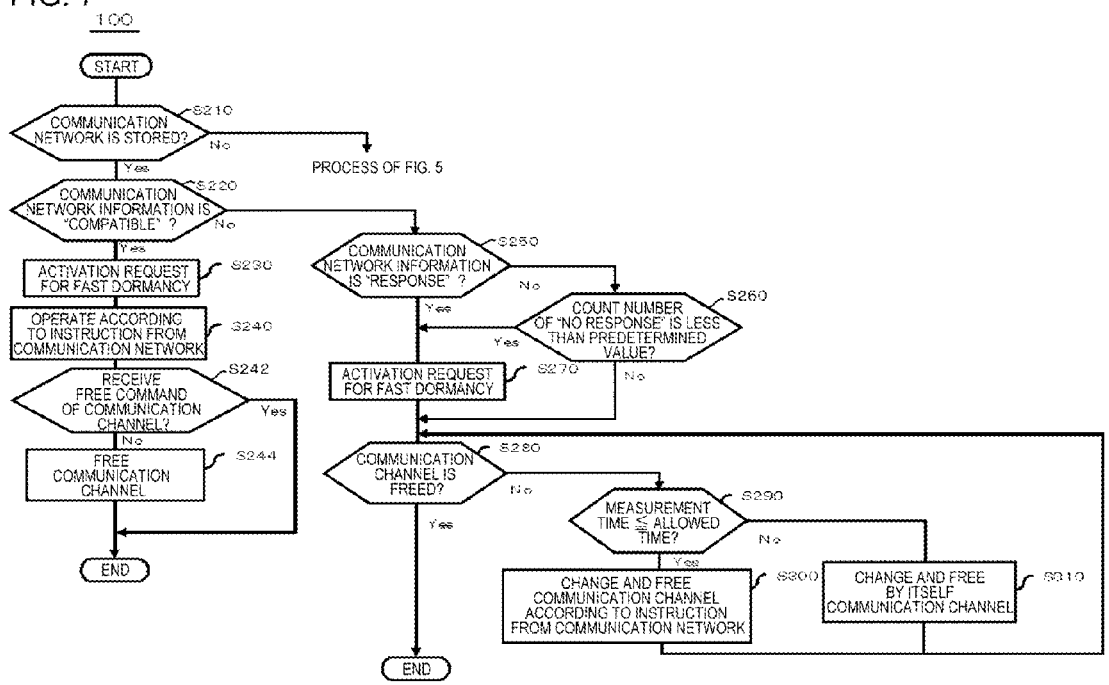
FIG. 7 is a flowchart illustrating a second operation of the information processing device.

FIG. 7 is a flowchart illustrating a second operation of the information processing device 100. The flowchart illustrates the process when the control unit 120 of the information processing device 100 frees the communication channel using the communication network information.

First, the control unit 120 determines whether the communication network identification information of the communication network 200 which is currently performing the packet communication is stored in the communication network information storage unit 160. When the communication network identification information is not stored in the communication network information storage unit 160 (step S210: No), the control unit 120 causes the communication network information generation unit 170 to perform the process shown in FIG. 5.

When the communication network information of the communication network 200 is stored (step S210: Yes), the control unit 120 reads the communication network information from the communication network information storage unit 160. Then, when the communication network information that is read indicates being compatible with the Fast Dormancy function (step S220: Yes), the control unit 120 performs the process according to the Fast Dormancy function with respect to the communication network 200. Specifically, the control unit 120 transmits the activation request for Fast Dormancy to the communication network 200 (step S230), and then performs an operation according to the instruction from the communication network 200 (step S240). For example, if the free command of the communication channel is received immediately after performing the activation request for Fast Dormancy, the control unit 120 frees the communication channel and transits to the low power consumption state.

In addition, when not receiving the free command of the communication channel within a predetermined time (step S242: No), the control unit 120 determines that the free command transmitted from the communication network 200 could not be received, and thus establishes independently the communication channel (step S244). In a case of receiving the free command of the communication channel within a predetermined time (step S242: Yes), the control unit 120 establishes the communication channel according to the free command, and thus step S244 is omitted.

On the other hand, when the communication network information that is read did not indicate being compatible with the Fast Dormancy function (step S220: No), the control unit 120 frees the communication channel according to the following procedure.

First, when the communication network information that is read was "response" (step S250: Yes), and when the communication network information that is read was "incompatible" (step S250: No) but the count number of "no response" was less than a predetermined value (step S260: Yes), the control unit 120 transmits the activation request for Fast Dormancy to the communication network 200 (step S270). Note that, when the communication network information that is read was "incompatible" (step S250: No) but the count number of "no response" was equal to or greater than a predetermined value (step S260: No), the control unit 120 does not perform the process shown in step S270.

Next, the control unit 12 receives an instruction from communication network 200. Then, when the instruction was the free command of the communication channel, the control unit 120 frees the communication channel and transits to the low power consumption state (step S280: Yes). On the other hand, in a case where the free command of the communication channel from the communication network 200 is not received (step S280: No), the control unit 120 determines whether the time that is stored in step S110 of FIG. 5 is within an allowable time. The allowable time is set and stored by the control unit 120 in advance. In a case within the allowable time (step S290: Yes), the control unit 120 performs the changing and the freeing of the communication channel according to an instruction from the communication network 200 (step S300). On the other hand, when the time stored in step S110 of FIG. 5 was longer than the allowable time (step S290: No), after the allowable time elapses since the packet communication is ended, the control unit 120 performs independently the changing and the freeing of the communication channel (step S310). Accordingly, the communication channel is freed (step S280), and the information processing device 100 transits to the low power consumption state. Note that, the process shown in step S290 to step S310 is performed even when the communication network information is any one of "response" and "incompatible".

Note that, it is preferable that the higher the bit rate of the communication channel is, the shorter the allowable time is set to be. This is because that the power consumption of the information processing device 100 is likely to increase, as the bit rate of the communication channel becomes high.

Further, the process shown in FIG. 7 may be performed only when the remaining battery amount of the information processing device 100 is equal to or less than a reference value. This is because the process shown in FIG. 7 may cause a loss of synchronization in the communication network 200 and burdens the communication network 200.

Further, in the process shown in FIG. 7, the allowable time may vary depending on the application software operated in the information processing device 100. This is because the communication amount, the number of the communications, the presence or absence of the user's operation, and the necessity of the real-time performance vary depending on the application software.

Specifically, the application activated in the background on a regular basis (such as Keep alive) performs the packet communication in the background on a regular basis. Since such a process has a great influence on the power consumption of the information processing device 100 without user's recognition, it is necessary to prevent as much as possible the waste of power consumption caused by continuing existence of the unnecessary communication channels. Further, the process does not need to be processed in real-time. Therefore, in this case, the allowable time is set to be short, and thus the communication channel is freed early.

On the other hand, a push-type application (such as a mail reception) performs sporadically the packet communication without the user's operation. The application has a less influence on the power consumption of the information processing device 100 than the application activated in the background, but does not need to be processed in real-time. Therefore, the allowable time is set to be short.

On the other hand, in the user interactive type application (such as a browser), an interactive packet communication is performed by the user's operation. Since this application needs to be processed in real-time to some extent, it is preferable not to free the communication channel earlier than necessary, by setting the allowable time to be long.

Further, in the process shown in FIG. 7, when the remaining battery amount of the information processing device 100 is small, the allowable time may be shortened according to the remaining amount. For example, at least one level of reference value is set with respect to the remaining battery amount of the information processing device 100, and as the remaining battery amount is lower than the reference value, the allowable time may be shortened.

Figure 8:
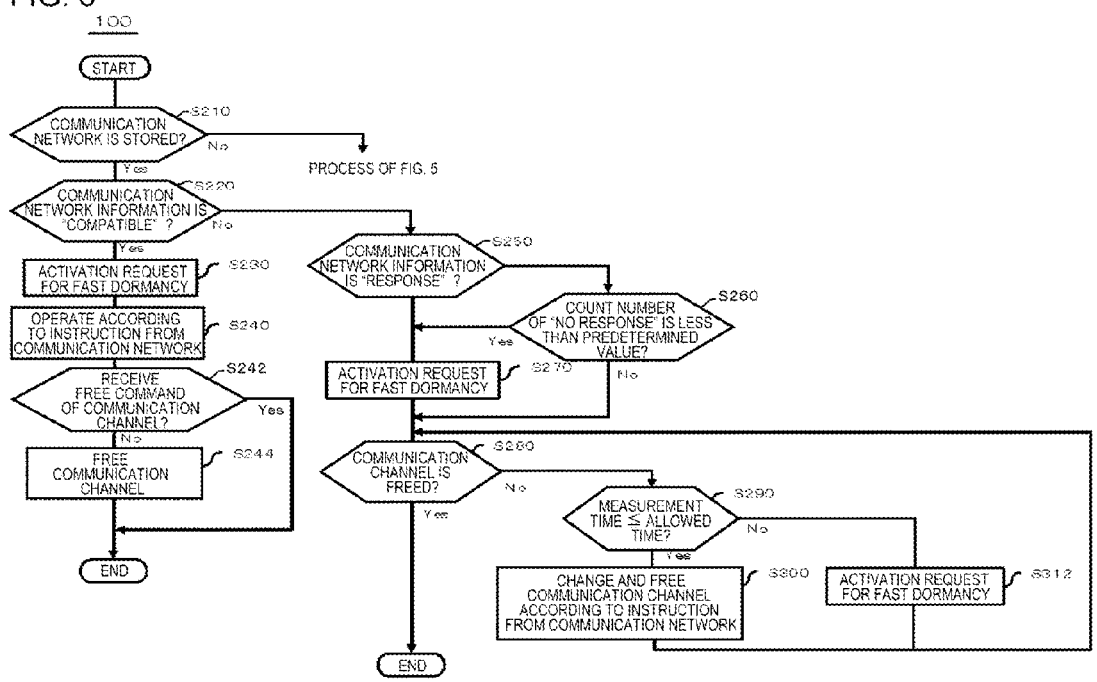
FIG. 8 is a flowchart illustrating a modification example of FIG. 7.

Further, as shown in FIG. 8, instead of step S310, the activation request for the Fast Dormancy may be sent (step S312).

Next, using FIG. 9 and FIG. 10, the operation and the effect of the present exemplary embodiment will be described. In the present exemplary embodiment, when the communication network 200 is compatible with the Fast Dormancy function, the control unit 120 frees the communication channel according to the Fast Dormancy function.

On the other hand, when the communication network 200 is not compatible with the Fast Dormancy function, the control unit 120 changes process depending on whether or not the time stored in step S110 of FIG. 5 is within the allowable time.

Specifically, when the time stored in step S110 of FIG. 5 is within the allowable time, as shown in FIG. 9, the control unit 120 performs the changing and freeing of the communication channel according to the instruction from the communication network 200.

On the other hand, when the time stored in step S110 of FIG. 5 is longer than the allowable time, as shown in FIG. 10, the control unit 120 performs independently the changing and the freeing of the communication channel after the allowable time elapses.

Accordingly, even in a case where the communication network 200 is not compatible with the Fast Dormancy function, the communication channel is certainly freed when the allowable time elapses. Therefore, it is possible to suppress the information processing device 100 from wasting power.

Further, when not receiving the free command of the communication channel within the predetermined time after the activation request for the Fast Dormancy is transmitted to the communication network 200 being compatible with the Fast Dormancy function, the control unit 120 of the information processing device 100 determines that the free command transmitted from the communication network 200 could not be received and frees independently the communication channel. If the communication channel is not freed independently in this case, it means that the information processing device 100 maintains the communication channel despite of that fact that the communication network 200 recognizes that the information processing device 100 freed the communication channel. In this case, the state discrepancy (whether or not to establish the communication channel) occurs between the information processing device 100 and the communication network 200, so a process to resolve the state discrepancy is necessary. Since this process is not necessary in the present exemplary embodiment, it is possible to reduce the resource consumption of the information processing device 100 and the communication network 200.

Note that, in the present exemplary embodiment, when power of the information processing device 100 is turned on or in selection of network that is performed at the time of return to the inside the communication range from the outside the communication range, the communication network 200, which is compatible with the Fast Dormancy or in which the time from the determination of end of the packet communication to the freeing of the packet communication channel is short, may be preferentially selected by referring to the communication network information that the communication network information storage unit 160 stores. Further, on a search list screen of the communication network for the user's operation, whether or not the communication network 200 is preferable in terms of the power consumption as described above may be displayed in the list. In this manner, it is possible for the user to select the communication network 200.

Note that, according to the present invention, following inventions are disclosed.

(Note 1)

A communication device including a communication network information storage unit which stores communication network information indicating whether or not a communication network that performs a packet communication is compatible with a Fast Dormancy function;

a free procedure setting unit which reads the communication network information from the communication network information storage unit when the packet communication through the communication network is ended, and sets a free procedure of a communication channel based on the communication network information; and a control unit which frees the communication channel according to the procedure that the free procedure setting unit sets.

(Note 2)

The communication device according to Note 1 including a communication network information generation unit which transmits an activation request for Fast Dormancy to the communication network, and generates the communication network information based on a response with respect to the activation request from the communication network.

(Note 3)

The communication device according to Note 2, wherein the communication network information generation unit transmits the activation request a plurality of times, and determines that the communication network is not compatible with Fast Dormancy function when there is no response with respect to all of the activation requests from the communication network.

(Note 4)

The communication device according to any one of Notes 1 to 3, wherein the free procedure setting unit sets the free procedure according to Fast Dormancy function when the communication network information indicates that the communication network is compatible with the Fast Dormancy function, and wherein the free procedure setting unit sets the free procedure to free the communication channel after a predetermined time elapses when the communication network information indicates that the communication network is not compatible with the Fast Dormancy function.

(Note 5)

The communication device according to any one of Notes 1 to 3, wherein the free procedure setting unit sets the free procedure according to the Fast Dormancy function when the communication network information indicates that the communication network is compatible with the Fast Dormancy function, and wherein the free procedure setting unit sets the free procedure to free the communication channel according to an instruction from the communication network when the communication network information indicates that the communication network is not compatible with the Fast Dormancy function.

(Note 6)

The communication device according to any one of Notes 1 to 5, wherein the communication network information indicates any one of a first state in which the communication network has and is compatible with the Fast Dormancy function, a second state in which the communication network does not have the Fast Dormancy function, and a third state in which the communication network responds with respect to the Fast Dormancy request but does not transmit a command of freeing of the communication channel, and wherein the free procedure setting unit sets the same free procedure as the second state in a case of the third state.

(Note 7)

The communication device according to any one of Notes 1 to 6, wherein the communication network information includes a measurement time that is an actual measurement time from when transmitting the activation request for the Fast Dormancy to the communication network until when receiving a free command.

(Note 8)

The communication device according to Note 7, wherein the free procedure setting unit sets the free procedure to free the communication channel according to an instruction from the communication network when the measurement time is shorter than a predetermined time, and wherein the free procedure sets the free procedure to free the communication channel after the predetermined time elapses when the measurement time is longer than the predetermined time.

(Note 9)

The communication device according to Note 8, wherein the communication device has a battery, and wherein the free procedure setting unit sets the predetermined time based on a remaining battery amount of the communication device.

(Note 10)

The communication device according to Note 8, wherein the free procedure setting unit sets the predetermined time based on a bit rate of a communication with the communication network.

(Note 11)

The communication device according to any one of Notes 7 to 10, wherein the control unit selects the communication network that is compatible with the Fast Dormancy or the communication network in which the measurement time is short, based on the communication information, when power is turned on or in selection of network that is performed at the time of return to the inside the communication range from the outside the communication range.

(Note 12)

A communication system including a communication network, and a communication device that performs a packet communication through the communication network, in which the communication device includes:

a communication network information storage unit which stores communication network information indicating whether or not the communication network is compatible with a Fast Dormancy function;

a free procedure setting unit which reads the communication network information from the communication network information storage unit when the packet communication through the communication network is ended, and sets a free procedure of a packet communication based on the communication network information; and a control unit frees the communication channel according to the procedure that the free procedure setting unit sets.

(Note 13)

The communication system according to Note 12 including a communication network information generation unit which transmits an activation request for the Fast Dormancy to the communication network, and generates the communication network information based on a response with respect to the activation request from the communication network.

(Note 14)

The communication system according to Note 13, wherein the communication network information generation unit transmits the activation request a plurality of times, and determines that the communication network is not compatible with the Fast Dormancy function when there is no response with respect to all of the activation request from the communication network.

(Note 15)

The communication system according to Notes 12 to 14, wherein the free procedure setting unit sets the free procedure according to the Fast Dormancy function when the communication network information indicates that the communication network is compatible with the Fast Dormancy function, and wherein the free procedure setting unit sets the free procedure to free the communication channel after a predetermined time elapses when the communication network information indicates that the communication network is not compatible with the Fast Dormancy function.

(Note 16)

The communication system according to any one of Notes 12 to 14, wherein the free procedure setting unit sets the free procedure according to the Fast Dormancy function when the communication network information indicates that the communication network is compatible with the Fast Dormancy function, and wherein the free procedure setting unit sets the free procedure to free the communication channel according to an instruction from the communication network when the communication network information indicates that the communication network is not compatible with the Fast Dormancy function.

(Note 17)

The communication system according to any one of Notes 12 to 16, wherein the communication network information indicates any one of a first state in which the communication network has and is compatible with the Fast Dormancy function, a second state in which the communication network does not have the Fast Dormancy function, and a third state in which the communication network responds with respect to the Fast Dormancy request but does not transmit a command of freeing of the communication channel, and wherein the free procedure setting unit sets the same free procedure as the second state in a case of the third state.

(Note 18)

The communication system according to any one of Notes 12 to 17, wherein the communication network information includes a measurement time that is an actual measurement time from when transmitting the activation request for the Fast Dormancy to the communication network until when receiving a free command.

(Note 19)

The communication system according to Note 18, wherein the free procedure setting unit sets the free procedure to free the communication channel according to an instruction from the communication network when the measurement time is shorter than a predetermined time, and wherein the free procedure setting unit sets the free procedure to free the communication channel after the predetermined time elapses when the measurement time is longer than the predetermined time.

(Note 20)

The communication system according to Note 19, wherein the communication device has a battery, and wherein the free procedure setting unit sets the predetermined time based on a remaining battery amount of the communication device.

(Note 21)

The communication system according to Note 19, wherein the free procedure setting unit sets the predetermined time based on a bit rate of a communication with the communication network.

(Note 22)

The communication system according to any one of Notes 18 to 21, the control unit selects the communication network that is compatible with the Fast Dormancy or the communication network in which the measurement time is short, based on the communication information, when power is turned on or in selection of network that is performed at the time of return to the inside the communication range from the outside the communication range.

(Note 23)

A communication method, by which a communication device performs a packet communication through a communication network, comprising:

causing the communication device store communication network information indicating whether or not a communication network is compatible with a Fast Dormancy function; and causing the communication device to read the stored communication network information when the packet communication through the communication network is ended, to set a free procedure of a communication channel based on the communication network information, and to free the communication channel according to the free procedure.

(Note 24)

The communication method according to Note 23, further comprising:

causing the communication device to transmit an activation request for the Fast Dormancy to the communication network, and to generate the communication network information based on a response with respect to the activation request from the communication network.

(Note 25)

The communication method according to Note 24, wherein the communication device transmits the activation request a plurality of times, and determines that the communication network is not compatible with the Fast Dormancy function when there is no response with respect to all of the activation request from the communication network.

(Note 26)

The communication method according to any one of Notes 23 to 25 further comprising:

causing the communication device to set the free procedure according to the Fast Dormancy function when the communication network information indicates that the communication network is compatible with the Fast Dormancy function, and causing the communication device to set the free procedure to free the communication channel after a predetermined time elapses when the communication network information indicates that the communication network is not compatible with the Fast Dormancy function.

(Note 27)

The communication method according to any one of Notes 23 to 25 further comprising:

causing the communication device to set the free procedure according to the Fast Dormancy function when the communication network information indicates that the communication network is compatible with the Fast Dormancy function, and causing the communication device to set the free procedure to free the communication channel according to an instruction from the communication network when the communication network information indicates that the communication network is not compatible with the Fast Dormancy function.

(Note 28)

The communication method according to any one of Notes 23 to 27, wherein the communication network information includes a measurement time that is an actual measurement time from when transmitting the activation request for Fast Dormancy to the communication network until when receiving a free command.

(Note 29)

The communication method according to Note 28 further comprising:

causing the communication device to set the free procedure to free the communication channel according to an instruction from the communication network when the measurement time is shorter than a predetermined time, and causing the communication device to set the free procedure to free the communication channel after the predetermined time elapses when the measurement time is longer than the predetermined time.

(Note 30)

The communication method according to Note 29, wherein the communication device has a battery and sets the predetermined time based on a remaining battery amount of the communication device.

(Note 31)

The communication method according to Note 29 further comprising causing the communication device to set the predetermined time based on a bit rate of a communication with the communication network.

(Note 32)

The communication method according to any one of Notes 28 to 31, wherein the communication device selects the communication network that is compatible with Fast Dormancy or the communication network in which the measurement time is short, based on the communication information, when power is turned on or in selection of network that is performed at the time of return to the inside the communication range from the outside the communication range.

(Note 33)

The communication method according to any one of Notes 23 to 32, wherein the communication network information indicates any one of a first state in which the communication network has and is compatible with the Fast Dormancy function, a second state in which the communication network does not have the Fast Dormancy function, and a third state in which the communication network responds with respect to the Fast Dormancy request but does not transmit a command of freeing of the communication channel, and the communication method further comprising causing the communication device to set the same free procedure as the second state when the communication network information indicates the third state.

(Note 34)

A program that causes a communication device to perform a packet communication through communication network, the program causing the communication device to execute:

a function of storing communication network information indicating whether or not the communication network is compatible with a Fast Dormancy function;

a function of reading the stored communication network information when the packet communication through the communication network is ended, and setting a free procedure of a communication channel based on the communication network information; and a function of freeing the communication channel according to the free procedure that is set.

(Note 35)

The program according to Note 34 further causing the communication device to execute:

a function of transmitting an activation request for the Fast Dormancy to the communication network, and generating the communication network information based on a response with respect to the activation request from the communication network.

(Note 36)

The program according to Note 35, wherein the function of generating the communication network information transmits the activation request a plurality of times, and determines that the communication network is not compatible with the Fast Dormancy function if there is no response with respect to all of the activation request from the communication network.

(Note 37)

The program according to any one of Notes 34 to 36, wherein the function of setting the free procedure sets the free procedure according to the Fast Dormancy function when the communication network information indicates that the communication network is compatible with the Fast Dormancy function, and wherein the function of setting the free procedure sets the free procedure to free the communication channel after a predetermined time elapses when the communication network information indicates that the communication network is not compatible with the Fast Dormancy function.

(Note 38)

The program according to any one of Notes 34 to 36, wherein the function of setting the free procedure sets the free procedure according to the Fast Dormancy function when the communication network information indicates that the communication network is compatible with the Fast Dormancy function, and wherein the function of setting the free procedure sets the free procedure to free the communication channel according to an instruction from the communication network when the communication network information indicates that the communication network is not compatible with the Fast Dormancy function.

(Note 39)

The program according to any one of Notes 34 to 38, wherein the communication network information includes a measurement time that is an actual measurement time from when transmitting the activation request for Fast Dormancy to the communication network until when receiving a free command.

(Note 40)

The program according to Note 39, wherein the function of setting the free procedure sets the free procedure to establish the communication channel according to an instruction from the communication network when the measurement time is shorter than a predetermined time, and wherein the function of setting the free procedure sets the free procedure to free the communication channel after the predetermined time elapses when the measurement time is longer than the predetermined time.

(Note 41)

The program according to Note 40, wherein the communication device has a battery, and wherein the function of setting the free procedure sets the predetermined time, based on a remaining battery amount of the communication device.

(Note 42)

The program according to Note 40, wherein the communication device sets the predetermined time based on a bit rate of a communication with the communication network.

(Note 43)

The program according to any one of Notes 39 to 42, further causing executing a function of selecting the communication network that is compatible with Fast Dormancy or the communication network in which the measurement time is short, based on the communication information, when power is turned on or in selection of network that is performed at the time of return to the inside the communication range from the outside the communication range.

Hitherto, the description of exemplary embodiments of the present invention has been made referring to drawings, the exemplary embodiments are only examples of the present invention, and various configurations other than the above exemplary embodiments can be employed.

This application claims a priority based on Japanese patent application No. 2011-072667 filed on Mar. 29, 2011, and the entire disclosure is incorporated herein.

The invention claimed is:

1. A communication device comprising:
a communication network information storage unit which stores communication network information indicating whether or not a communication network that performs a packet communication is compatible with a Fast Dormancy function;
a free procedure setting unit which reads the communication network information from the communication network information storage unit when the packet communication through the communication network is ended, and sets a free procedure of a communication channel based on the communication network information;
a control unit which frees the communication channel according to the procedure that the free procedure setting unit sets; and
a communication network information generation unit which transmits an activation request for Fast Dormancy to the communication network, and generates the communication network information based on a response with respect to the activation request from the communication network.

2. The communication device according to claim 1, wherein the communication network information generation unit transmits the activation request a plurality of times, and determines that the communication network is not compatible with the Fast Dormancy function when there is no response with respect to all of the activation requests from the communication network.

3. The communication device according to claim 1, wherein the free procedure setting unit sets the free procedure according to the Fast Dormancy function when the communication network information indicates that the communication network is compatible with the Fast Dormancy function, and
wherein the free procedure setting unit sets the free procedure to free the communication channel after a predetermined time elapses when the communication network information indicates that the communication network is not compatible with the Fast Dormancy function.

4. The communication device according to claim 1, wherein the free procedure setting unit sets the free procedure according to the Fast Dormancy function when the communication network information indicates that the communication network is compatible with the Fast Dormancy function, and
wherein the free procedure setting unit sets the free procedure to free the communication channel according to an instruction from the communication network when the communication network information indicates that the communication network is not compatible with the Fast Dormancy function.

5. The communication device according to claim 1, wherein the communication network information indicates any one of a first state in which the communication network has and is compatible with the Fast Dormancy function, a second state in which the communication network does not have the Fast Dormancy function, and a third state in which the communication network responds with respect to the Fast Dormancy request but does not transmit a command of freeing of the communication channel, and
wherein the free procedure setting unit sets the same free procedure as the second state in a case of the third state.

6. A communication system comprising:
a communication network; and
a communication device that performs a packet communication through the communication network, the communication device including:
a communication network information storage unit which stores communication network information indicating whether or not the communication network is compatible with a Fast Dormancy function,
a free procedure setting unit which reads the communication network information from the communication network information storage unit when the packet communication through the communication network is ended, and sets a free procedure of a communication channel based on the communication network information,
a control unit which frees the communication channel according to the procedure that the free procedure setting unit sets, and
a communication network information generation unit which transmits an activation request for Fast Dormancy to the communication network, and generates the communication network information based on a response with respect to the activation request from the communication network.

7. A communication method comprising:
causing a communication device to store communication network information indicating whether or not a communication network that performs a packet communication is compatible with a Fast Dormancy function;
causing the communication device to read the stored communication network information when the packet communication through the communication network is ended, to set a free procedure of a communication channel based on the communication network information, and to free the communication channel according to the free procedure; and
causing the communication device to transmit an activation request for Fast Dormancy to the communication network, and generating the communication network information based on a response with respect to the activation request from the communication network.

8. A non-transitory computer-readable storage medium storing a program that causes a communication device to perform a packet communication through a communication network, the program causing the communication device to execute:
a function of storing communication network information indicating whether or not the communication network is compatible with a Fast Dormancy function;
a function of reading the stored communication network information when the packet communication through the communication network is ended, and setting a free procedure of a communication channel based on the communication network information;
a function of freeing the communication channel according to the free procedure that is set; and
a function of transmitting an activation request for Fast Dormancy to the communication network, and generating the communication network information based on a response with respect to the activation request from the communication network.

9. The communication device according to claim 2,
wherein the free procedure setting unit sets the free procedure according to the Fast Dormancy function when the communication network information indicates that the communication network is compatible with the Fast Dormancy function, and
wherein the free procedure setting unit sets the free procedure to free the communication channel after a predetermined time elapses when the communication network information indicates that the communication network is not compatible with the Fast Dormancy function.

10. The communication device according to claim 2,
wherein the free procedure setting unit sets the free procedure according to the Fast Dormancy function when the communication network information indicates that the communication network is compatible with the Fast Dormancy function, and
wherein the free procedure setting unit sets the free procedure to free the communication channel according to an instruction from the communication network when the communication network information indicates that the communication network is not compatible with the Fast Dormancy function.

11. The communication device according to claim 2,
wherein the communication network information indicates any one of a first state in which the communication network has and is compatible with the Fast Dormancy function, a second state in which the communication network does not have the Fast Dormancy function, and a third state in which the communication network responds with respect to the Fast Dormancy request but does not transmit a command of freeing of the communication channel, and
wherein the free procedure setting unit sets the same free procedure as the second state in a case of the third state.

12. The communication device according to claim 3,
wherein the communication network information indicates any one of a first state in which the communication network has and is compatible with the Fast Dormancy function, a second state in which the communication network does not have the Fast Dormancy function, and a third state in which the communication network responds with respect to the Fast Dormancy request but does not transmit a command of freeing of the communication channel, and
wherein the free procedure setting unit sets the same free procedure as the second state in a case of the third state.

13. The communication device according to claim 4,
wherein the communication network information indicates any one of a first state in which the communication network has and is compatible with the Fast Dormancy function, a second state in which the communication network does not have the Fast Dormancy function, and a third state in which the communication network responds with respect to the Fast Dormancy request but does not transmit a command of freeing of the communication channel, and
wherein the free procedure setting unit sets the same free procedure as the second state in a case of the third state.

14. The communication device according to claim 10,
wherein the communication network information indicates any one of a first state in which the communication network has and is compatible with the Fast Dormancy function, a second state in which the communication network does not have the Fast Dormancy function, and a third state in which the communication network responds with respect to the Fast Dormancy request but does not transmit a command of freeing of the communication channel, and
wherein the free procedure setting unit sets the same free procedure as the second state in a case of the third state.

\* \* \* \* \*